J. W. & A. RUGER.
Dough-Kneaders.

No. 221,364.  Patented Nov. 4, 1879.

Witnesses:
Chas. J. Buchheit
Edw. J. Brady

J. W. Ruger
Augustus Ruger  Inventors
By Wilhelm & Bonner
Attorneys.

UNITED STATES PATENT OFFICE.

JAMES W. RUGER AND AUGUSTUS RUGER, OF BUFFALO, NEW YORK.

IMPROVEMENT IN DOUGH-KNEADERS.

Specification forming part of Letters Patent No. 221,364, dated November 4, 1879; application filed July 14, 1879.

*To all whom it may concern:*

Be it known that we, JAMES W. RUGER and AUGUSTUS RUGER, both of the city of Buffalo, in the county of Erie and State of New York, have invented a new and useful Improvement in Machines for Kneading Soft Dough, &c., of which the following is a specification, reference being had to the accompaning drawings.

This invention relates to a machine designed for kneading soft dough, beating eggs, and preparing the dough generally for soft-cake machines, by intimately mixing the ingredients in a thorough and expeditious manner.

The object of our invention is to produce a simple and compact machine of this character; and it consists in the peculiar construction of the apparatus, whereby a thorough mixing of the ingredients of the dough is effected and a free and complete discharge of the dough through the central discharge-opening is obtained, as will be hereinafter fully set forth.

Figure 1:
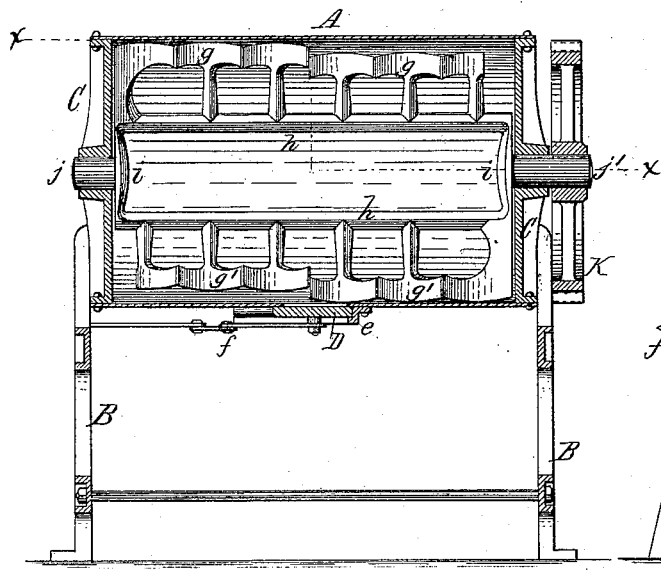
Figure 2:
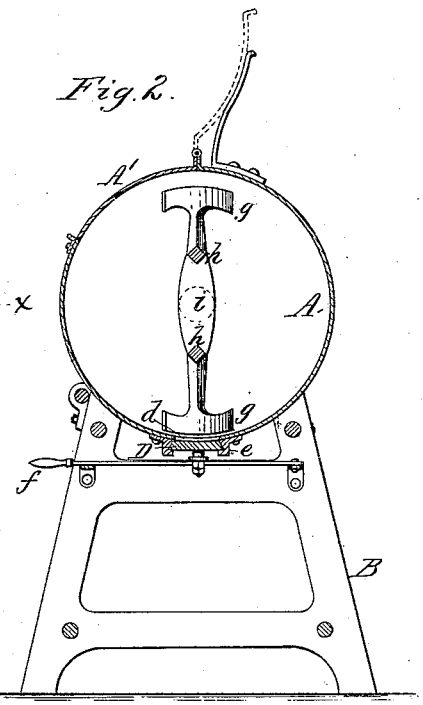
Figure 3:
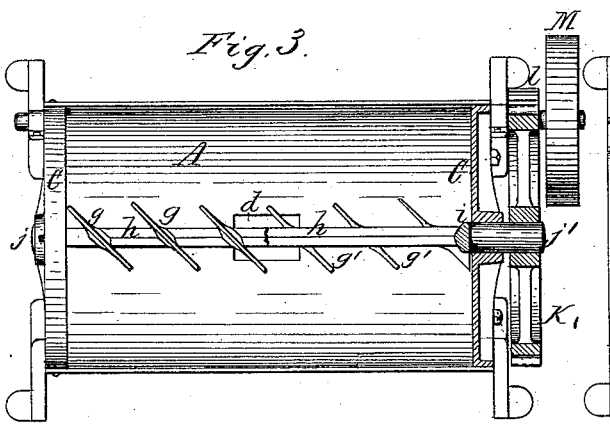
Figure 4:
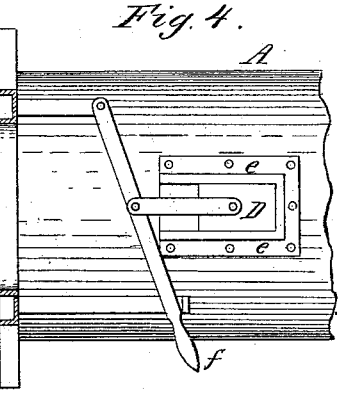

In the accompanying drawings, Figure 1 is a sectional elevation of our improved dough-mixing machine. Fig. 2 is a cross-section thereof. Fig. 3 is a horizontal section in line $x\ x$, Fig. 1. Fig. 4 is a bottom-plan view of the machine.

Like letters of reference designate like parts in the several figures.

A represents the cylindrical case of the machine arranged horizontally, and supported by end frames, B, connecting with the heads C of the case A.

The case A is constructed with a hinged upper portion, A', which can be opened for introducing the ingredients to be mixed into the case A.

$d$ is the discharge-orifice, arranged centrally in the bottom of the case A, and closed by a slide, D, which is arranged in dovetail ways, $e$, and operated by means of a hand-lever, $f$.

$g$ and $g'$ represent the mixing-blades, arranged within the case A in two longitudinal rows or sets, diametrically opposite each other. As shown in the drawings, the blades $g\ g'$ are each provided with a short stem, connecting with a longitudinal bar, $h$, which connects at its ends with arms $i$, whereby a skeleton frame is produced, the bars $h$ serving as auxiliary mixers, and leaving the center of the cylinder free to accommodate the movement of the dough.

This system of blades turns on short shafts or arbors $j\ j'$, arranged centrally in the heads C of the case A. The driving power is applied to the shaft $j'$ by means of a gear-wheel, K, pinion $l$, and pulleys M M', or in any other suitable manner.

The blades $g\ g'$ are arranged at an angle to the direction of their motion, the inclination being to the right in the blades $g$, and to the left in the blades $g'$, so that the blades work the dough alternately to the left and right, whereby a most thorough mixing of the ingredients is accomplished.

The blades are made of such length that the front end of one blade will be in line with or project past the rear end of the next adjacent blade, whereby the entire inner surface of the cylinder is covered by the action of the blades.

In each set the blades on that side of the central line from which the material is moved toward the center are arranged to run in contact with the inner surface of the cylinder, or nearly so, while the blades on the other side of the central line are arranged to leave an open space between the outer edge of the blades and the inner surface of the cylinder, as clearly shown in Fig. 1. By this arrangement of the blades a complete discharge of the material through the central opening, $d$, and a perfect cleaning of the machine are effected, as only those blades which run in contact with the cylinder and move the material toward the central opening affect the motion of the material after it gets low in the case, while the other blades, which would tend to move the material away from the central opening, do not operate upon the thin film of dough lying next to the inner surface of the case A.

The alternate right-and-left motion to which the dough is subjected by the mixing-blades serves to intimately and rapidly mix the ingredients of the dough, and requires only a comparatively small expenditure of power.

We claim as our invention—

The combination, with the horizontal case A, provided with central discharge-opening, $d$, of two or more rows of mixing-blades $g\ g'$, the blades on one side of the central opening being arranged to run in contact with the case, and on the other side of the opening removed from the case, substantially as set forth.

JAMES W. RUGER.
AUGUSTUS RUGER.

Witnesses:
JNO. J. BONNER,
CHAS. J. BUCHHEIT.